United States Patent
Kodaira et al.

[11] Patent Number: 6,158,671
[45] Date of Patent: Dec. 12, 2000

[54] HEADLAMP CLEANER

[75] Inventors: Shigeru Kodaira; Kenichi Takeda; Hajime Tabata, all of Wako, Japan

[73] Assignee: Honda Giken Kogyo Kabushiki Kaisha, Tokyo, Japan

[21] Appl. No.: 09/160,043

[22] Filed: Sep. 25, 1998

[30] Foreign Application Priority Data

Sep. 26, 1997 [JP] Japan .................................. 9-261618
Jun. 24, 1998 [JP] Japan ................................. 10-177234

[51] Int. Cl.[7] ...................................................... B05B 1/10
[52] U.S. Cl. ........................................................ 239/284.2
[58] Field of Search ............................... 239/121, 284.1, 239/284.2

[56] References Cited

U.S. PATENT DOCUMENTS 4,368,505 1/1983 Tomforde .............................. 239/284.2
4,531,255 7/1985 Yagasaki et al. ................. 239/284.1 X
4,768,716 9/1988 Buchanan, Jr. et al. ............. 239/284.1

FOREIGN PATENT DOCUMENTS 53-22464 2/1978 Japan .

Primary Examiner—Robert M. Fetsuga
Attorney, Agent, or Firm—Birch, Stewart, Kolasch & Birch, LLP

[57] ABSTRACT

A headlamp cleaner for a motorcycle includes a frame enclosing a headlamp lens. A cleaning nozzle is attached to an upper half of the frame. The nozzle ejects a cleaning agent downwardly over the lens against wind blowing upward during running of the motorcycle. Therefore, it is possible to minimize an amount of the cleaning agent scattered by the wind. Further, vehicle state detecting units are connected to a controller for the headlamp cleaner. No cleaning agent will be ejected, when the vehicle is detected to be in a condition, or state, where the cleaning agent is likely to disperse. The controller, in combination with the downwardly directed nozzle, is thus unlikely to disperse cleaning fluid toward a windscreen or rider of the motorcycle.

19 Claims, 13 Drawing Sheets

HEADLAMP CLEANER

BACKGROUND OF THE INVENTION

1. Field of the Invention

This invention relates to a headlamp cleaner for a motorcycle.

2. Description of the Relevant Art

A headlamp cleaner for a four-wheel vehicle is known. In Japanese Utility Model Laid-Publication Sho 53-22464, entitled "Headlamp Cleaner," a cleaning agent is ejected upwardly from a lower part of a headlamp. In this Japanese reference, a nozzle for ejecting the cleaning agent is attached to a bumper of the vehicle using a bracket. The nozzle ejects the cleaning agent upwards onto the headlamp lens thereby cleaning the lens.

Recently, there has been an increasing demand for a headlamp cleaner for a motorcycle. Simply, applying a headlamp cleaner, as disclosed in the Japanese Utility Model Laid-Publication Sho 53-22464, to a motorcycle would result in the motorcycle illustrated in FIG. 16 of the accompanying drawings. The headlamp cleaner illustrated in FIG. 16 would suffer several drawbacks, as discussed below.

With reference to FIG. 16, the motorcycle 100 includes a body frame 101, a front fork 102 positioned in front of the body frame 101 for steering, a front wheel 103 attached to the front fork 102, a fuel tank 104, a seat 105, an engine 106, and a rear wheel 107 at the rear part of the body frame 101. A fuel tank 104, a seat 105 and the engine 106 are positioned at the center of the body frame 101. A front cover 108 with a headlamp 109 is located at a forward portion of the body frame 101. Further, a headlamp cleaner 100 is arranged on the front cover 108.

The headlamp cleaner 100 is used for cleaning a lens of the headlamp 109 of the motorcycle while the motorcycle is in operation. However, when a cleaning agent 111 is ejected upwardly from the headlamp cleaner 110 as shown by the arrow labeled ①, it disperses in the shape of droplets 112 as indicated by the arrow labeled ②. The droplets 112 are pushed further upwards to opposite sides of the headlamp 109 by wind currents indicated by the large white arrows.

Sometimes, the cleaning agent 111, in the form of droplets 112 will reach a rider 113 depending upon the surrounding conditions. Further, it is conceivable that the cleaning agent will reach a windscreen due to wind currents caused by the running motorcycle.

SUMMARY OF THE INVENTION

Taking the foregoing problems of the related art into consideration, the present invention is intended to provide a headlamp cleaner for a motorcycle which can reduce dispersion of a cleaning agent toward the rider and windscreen.

It is an object of the present invention to provide a headlamp cleaner for cleaning a lens of a headlamp at a front part of a vehicle, with said cleaner comprising: a frame; a headlamp lens inside said frame wherein said frame includes upper, left and right portions extending forwardly away from an outer surface of said headlamp lens; and a cleaning nozzle attached to said upper portion of said frame, said nozzle having at least one hole substantially directed downwardly toward a ground surface beneath said vehicle for ejecting a cleaning agent across said lens.

It is a further object of the present invention to provide a headlamp cleaner for cleaning a lens of a headlamp at a front part of a vehicle, with said cleaner comprising: a headlamp lens; a cleaning nozzle, said nozzle having at least one hole for ejecting a cleaning agent across said lens; a first detector for detecting a vehicle state; an evaluator for determining whether or not the detected vehicle state meets a predetermined condition; and a cleaning controller for controlling whether or not cleaning of said headlamp lens is allowed, on the basis of whether the predetermined condition has been met.

It is yet a further object of the present invention to provide a headlamp cleaner for cleaning a lens of a headlamp at a front part of a vehicle, with said cleaner comprising: a frame; a headlamp lens inside said frame; a cleaning nozzle attached to an upper half of said frame, said nozzle having at least one hole substantially directed downwardly toward a ground surface beneath said vehicle for ejecting a cleaning agent across said lens; a first detector for detecting a vehicle state; an evaluator for determining whether or not the detected vehicle state meets a predetermined condition; and a cleaning controller for controlling whether or not cleaning of said headlamp lens is allowed, on the basis of whether the predetermined condition has been met.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
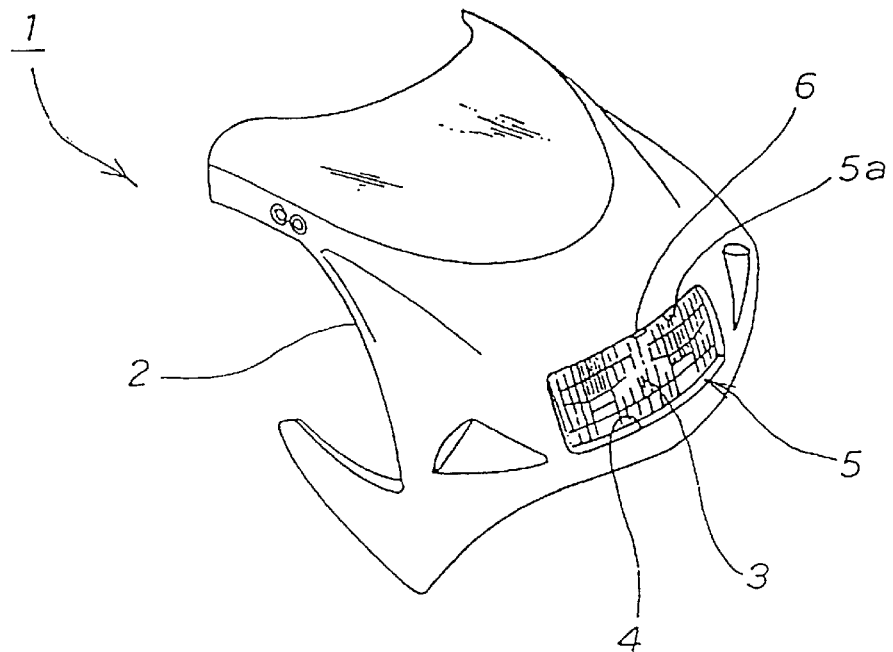
FIG. 1 is an upper front perspective view of a headlamp cleaner, in accordance with a first embodiment of the present invention.

With reference to FIG. 1, a headlamp cleaner assembly 1 includes a frame 5 provided on a front cover 2 of a motorcycle. The frame 5 is formed by an opening 4 in the front cover 2, which surrounds a headlamp lens 3. The frame 5 has a left side portion 5c, a right side portion 5b and an upper portion 5a, each folded rearwardly away from a front of the motorcycle. The frame also has a lower portion 5d. The left side portion 5c, right side portion 5b, upper portion 5a, and lower portion 5d extend forwardly, away from an outer surface of the headlamp lens 3 attached to an upper half of the frame 5 and more preferably to the upper portion 5a of the frame 5. The cleaning nozzle 6 can eject a cleaning agent downwardly in order to clean the lens 3.

In FIG. 1, the lens 3 is enclosed by the frame 5, which is formed by the front cover 2. It should be noted that it is also possible to enclose the headlamp by the frame without using a front cover depending upon a body style type of the motorcycle. Also, when the cleaning nozzle 6 is attached to the frame 5, the nozzle 6 becomes integral with the front cover 2, and does not project therefrom. Therefore, the external appearance of the motorcycle is improved.

Figure 2:
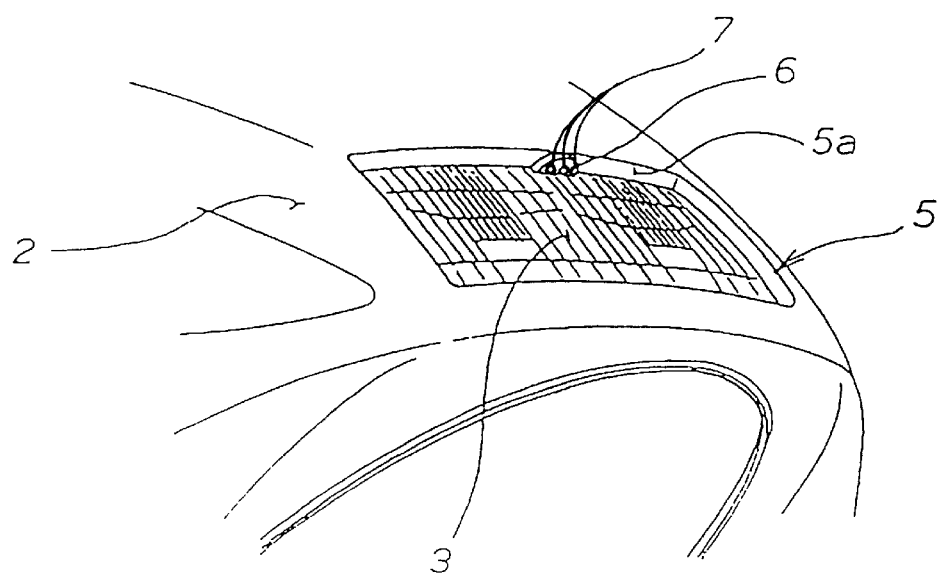
FIG. 2 is a lower front perspective view of the headlamp cleaner of FIG. 1.

FIG. 2 is another perspective view of the headlamp cleaner 1 of FIG. 1, viewed obliquely upward from underneath the front of the motorcycle. The cleaning nozzle 6 is attached to the upper portion 5a of the frame 5. Reference numeral 7 denotes holes formed on the cleaning nozzle 6. The nozzle 6 preferably has a plurality of holes 7. Further, a plurality of nozzles 6 may be used.

Figure 3:
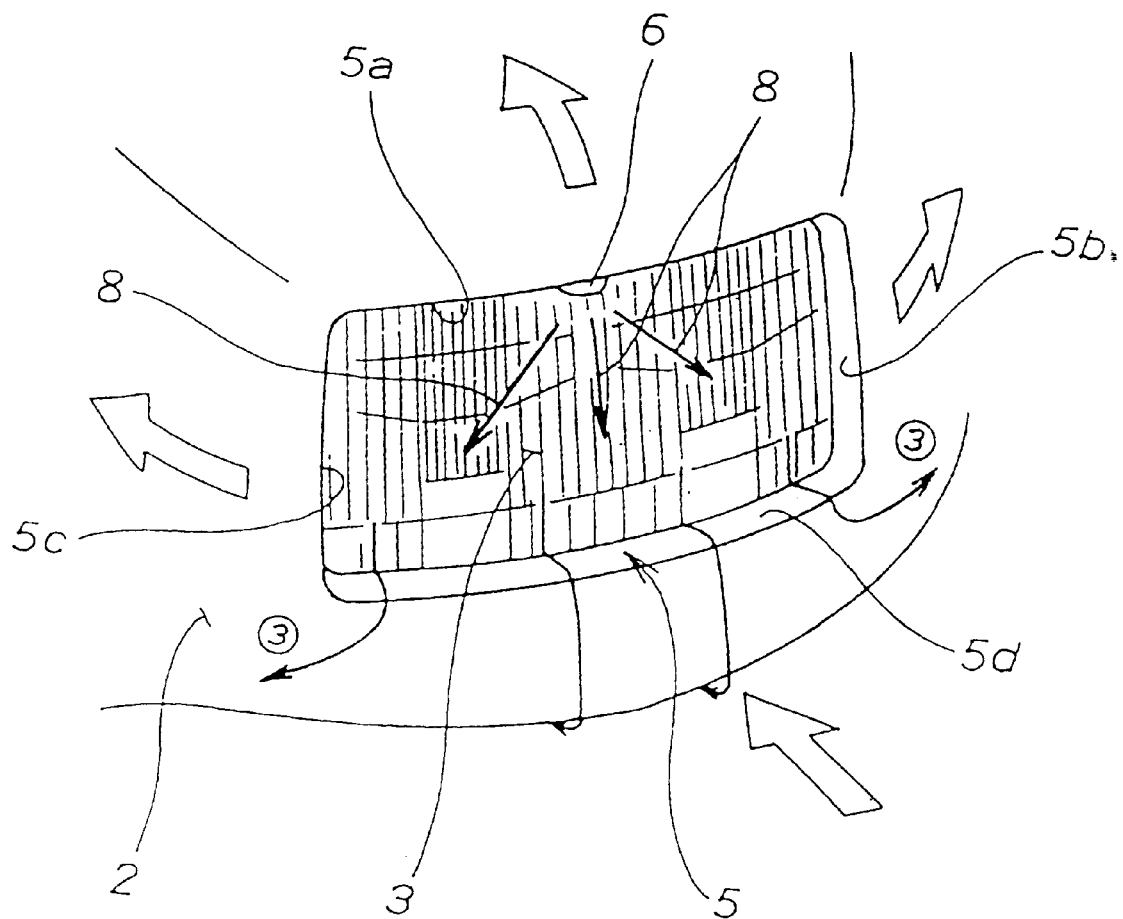
FIG. 3 illustrates the headlamp cleaner of FIG. 1 during operation.

FIG. 3 shows how the headlamp cleaner 1 operates. A cleaning agent 8 is ejected in downward jets onto the lens 3 from the cleaning nozzle 6. The cleaning agent 8 spreads over the lens 3, enclosed by the frame 5, and cleans the lens 3. Since the cleaning agent 8 is ejected downwardly against upward wind caused by the running motorcycle, it is unlikely that the cleaning agent 8 will disperse upwards. Further, the right and left side portions 5b and 5c of the frame 5 smoothly guide the spreading cleaning agent 8 downward. Therefore, it is not probable that the cleaning agent 8 will go over these side portions 5b and 5c.

After use, the cleaning agent 8 passes over the lower portion 5d of the frame 5. The lower portion 5d is not folded rearwardly away from the front of the motorcycle. Rather, the lower portion 5d extends slightly forward toward the front of the motorcycle, as illustrated in FIGS. 1 and 2, to form a frontmost portion of the front cover 2, and falls down via the surface of the front cover 2. When this occurs, some of the cleaning agent 8 will run down and be led backward along the left and right sides of the front cover 2, as shown by the arrows labeled ③, by wind currents shown by large white arrows. Here, the left and right sides denote the opposite sides of the rider seated on the motorcycle. Alternatively, the used cleaning agent 8 may be discharged downwardly via a slit formed at the lower part of the frame 5, without passing over the front cover 2.

Figure 4:
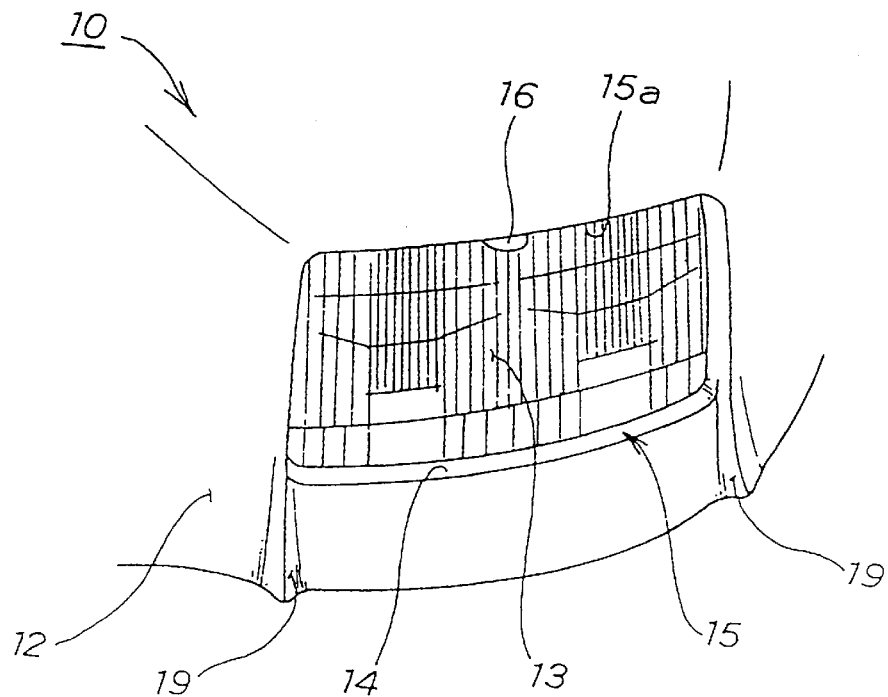
FIG. 4 is an upper front perspective view of a headlamp cleaner having a first modified lower frame portion.
Figure 5:
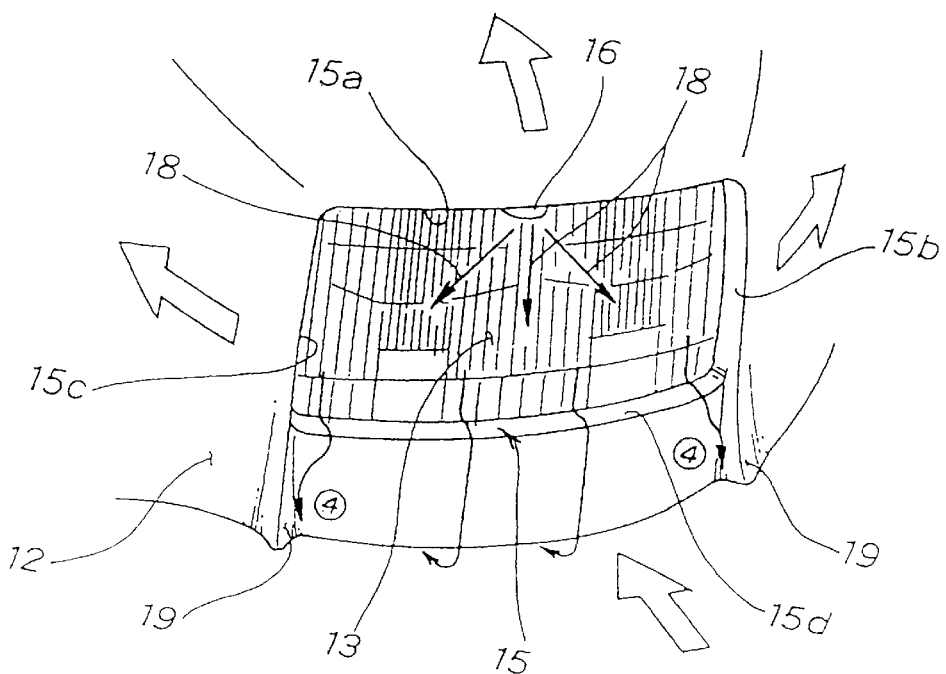
FIG. 5 illustrates the headlamp cleaner of FIG. 4 during operation.

FIGS. 4 and 5 are perspective views of a headlamp cleaner similar to the headlamp cleaner of FIG. 1–3, but with a modified lower frame portion. The headlamp cleaner 10 includes a frame 15 that is provided on a front cover 12. The frame is formed by an opening 14 for a headlamp lens 13, and has upper, left and right portions folded rearwardly. A cleaning nozzle 16 is attached to the upper portion 15a of the frame in order to eject a cleaning agent 18 downwardly to clean the lens 13. The front cover 12 is provided with a pair of guides 19, 19 for guiding the cleaning agent 18 downwardly over the lower part of the frame 15.

During the operation of the headlamp cleaner of FIGS. 4 and 5, the cleaning agent 18 is ejected in downward jets onto the lens 13 from the cleaning nozzle 16. The cleaning agent 18 spreads over the lens 13. Next, the cleaning agent 18 is smoothly guided along left and right portions 15b and 15c of the frame 15, and smoothly flows downwardly without going over the portions 15b and 15c. The guides 19, 19 on the front cover 12 are effective in guiding the used cleaning agent 18 downwardly from the frame 15 without allowing the cleaning agent 18 to disperse to the left and right. By this arrangement, even if some of the used cleaning agent 18 happens to flow rearwardly due to wind current (shown by large white arrows), the cleaning agent 18 is effectively guided downwardly by the guides 19, 19, as shown by the arrows labeled ④.

Figure 6:
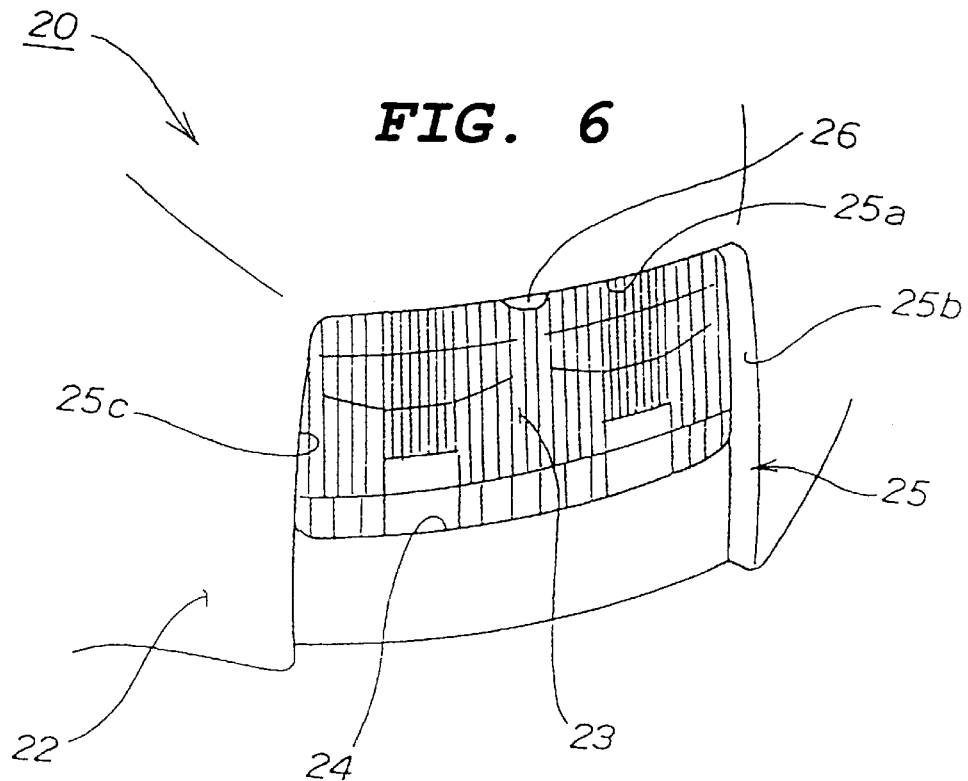
FIG. 6 is an upper front perspective view of a headlamp cleaner having a second modified lower frame portion.
Figure 7:
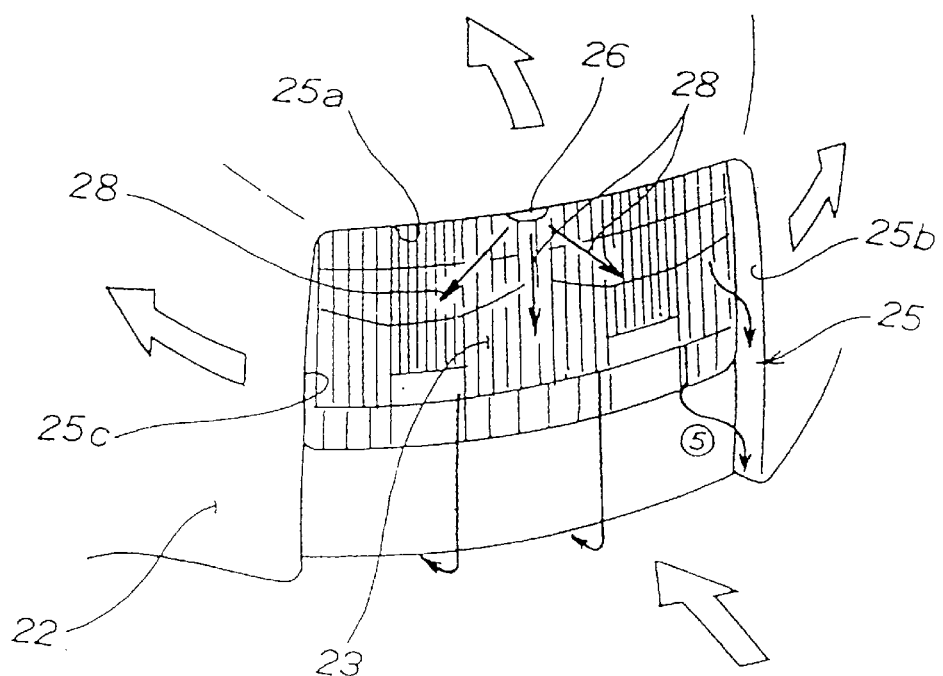
FIG. 7 illustrates the headlamp cleaner of FIG. 6 during operation.

FIGS. 6 and 7 are perspective views of a headlamp cleaner similar to the headlamp cleaner of FIGS. 1–3, but with a further modified lower frame portion. The headlamp cleaner 20 includes a frame 25 that is provided on a front cover 22 of the motorcycle. The frame 25 is formed by an opening 24 for a headlamp lens 23, and has upper, left and right portions 25a, 25b and 25c thereof folded rearwardly. A cleaning nozzle 26 is attached to the upper portion 25a in order to eject the cleaning agent 28 downwardly.

During the operation of the headlamp cleaner of FIGS. 6 and 7, the cleaning agent 28 is ejected in downward jets onto the lens 23 from the cleaning nozzle 26. The cleaning agent 28 spreads all over the headlamp lens 23. The left and right portions 25b and 25c smoothly guide the cleaning agent 28 downwardly, and prevent the cleaning agent from going over the portions 25b and 25c. It should be noted that the frame 25 has a non-folded lower portion, so that the used cleaning agent 28 is quickly discharged out of the frame 25. Further, the opposite side portions 25b and 25c extend to the lower edge of the front cover 22, thereby guiding the used cleaning agent 28 downwardly toward the lower parts of the front cover 22 as shown by the arrows labeled ⑤.

Figure 8:
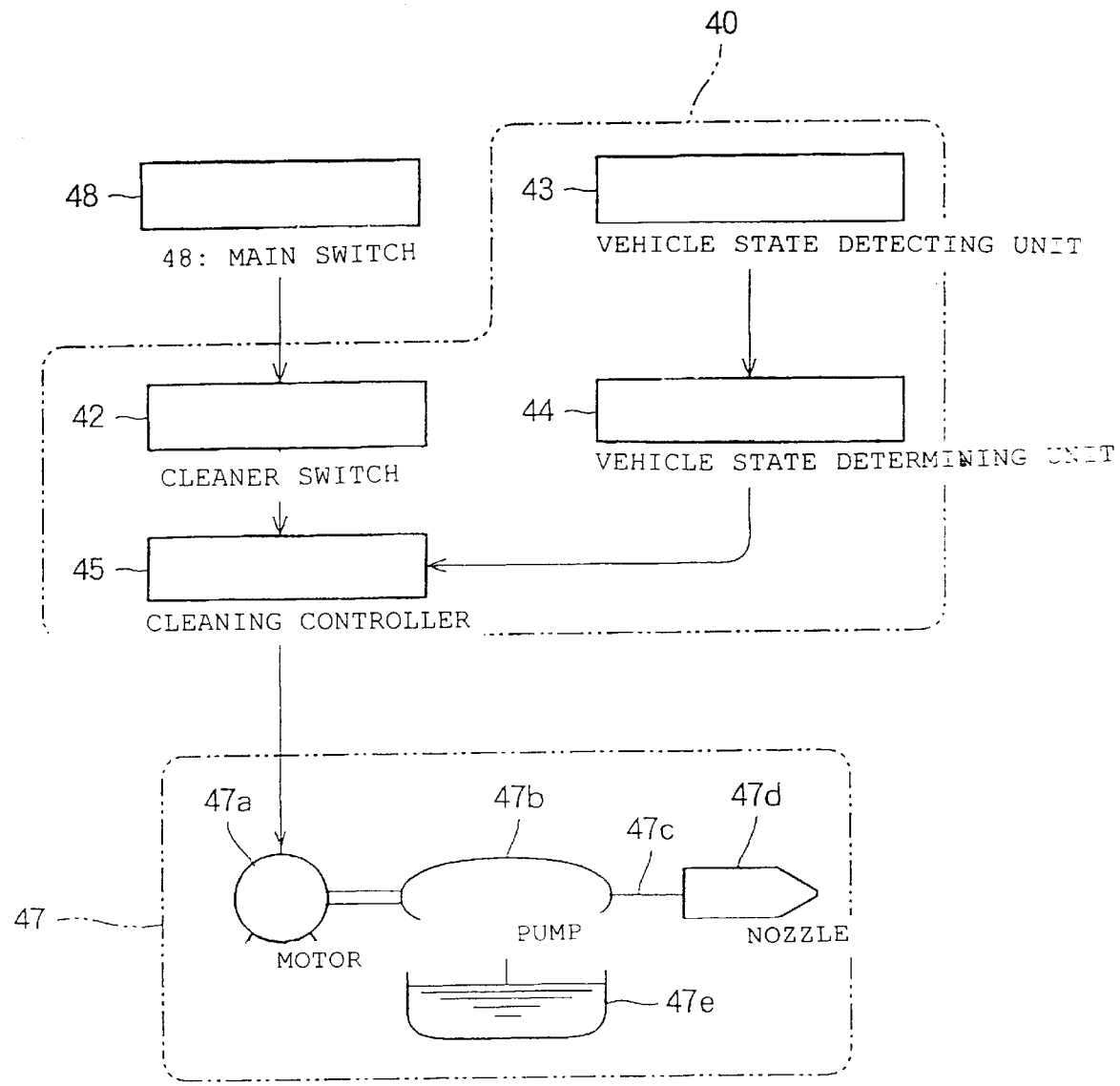
FIG. 8 is a block diagram of a first embodiment of a control unit for the headlamp cleaner.

FIG. 8 is a block diagram of a first embodiment of a control unit for the headlamp cleaner. The control unit 40 includes a cleaner switch 42; a vehicle state detecting unit 43 for detecting a vehicle state; a vehicle state determining unit 44 for determining whether or not the vehicle state meets predetermined conditions on the basis of a signal from the vehicle state detecting unit 43; and a cleaning controller 45 for turning on or off electric power from the cleaner switch 42 in response to a signal from the vehicle state determining unit 44. Reference numeral 48 denotes a main switch. Reference numeral 47 denotes a cleaning agent ejector, which includes a motor 47a, a pump 47b, a cleaning agent tank 47e, a nozzle 47b, and a tube 47c connecting the pump 47b to the nozzle 47d.

Figure 9:
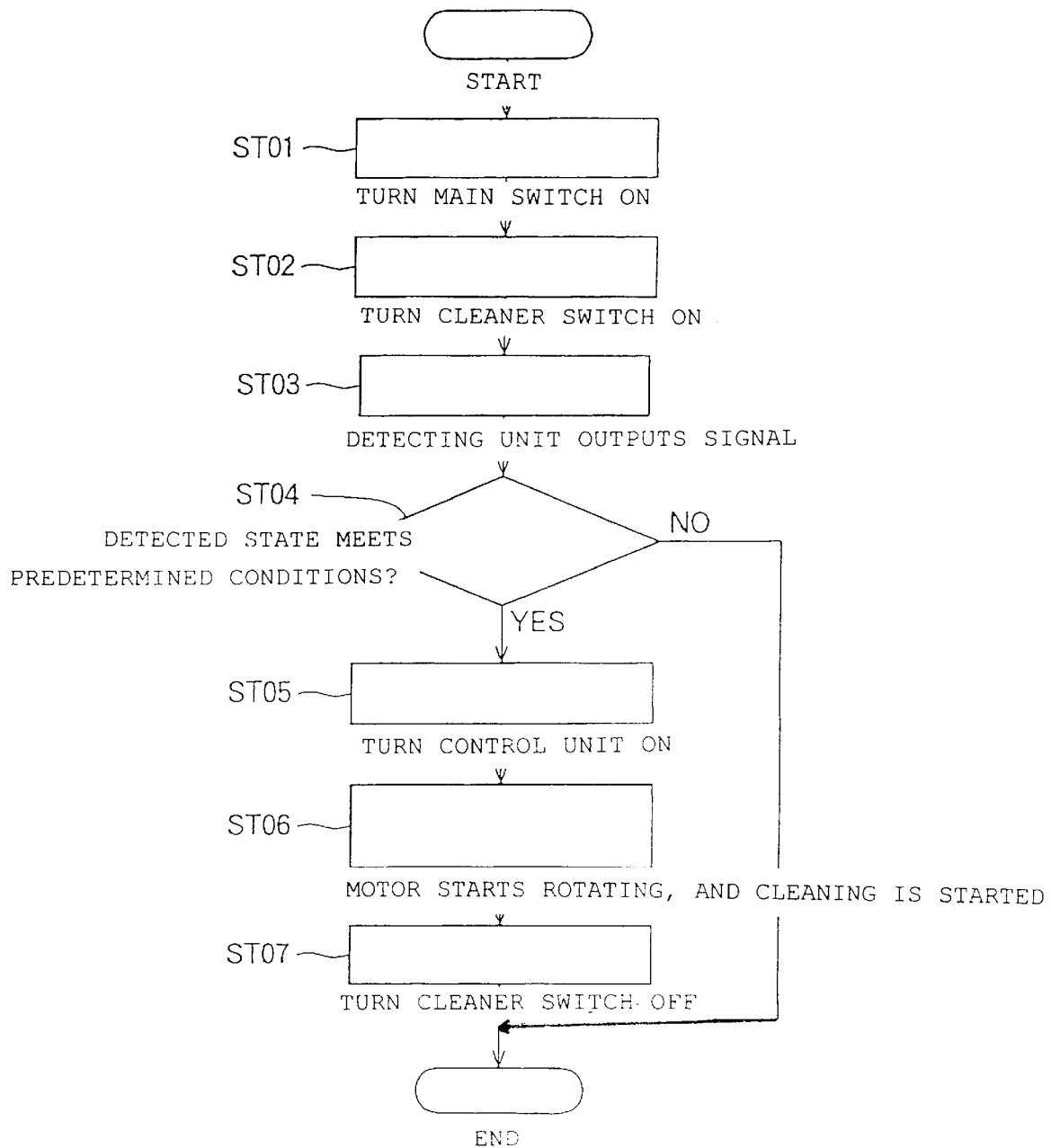
FIG. 9 is a flowchart illustrating an operation procedure for the control unit of FIG. 8.

FIG. 9 is a flowchart illustrating an operation procedure for the control unit 40 of FIG. 8. The operation includes the steps of:

ST01: The main switch is turned on using a key.

ST02: The cleaning switch is turned on in order to clean the headlamp lens.

ST03: The vehicle state detecting unit provides the vehicle state determining unit with a signal indicative of a detected result.

ST04: The vehicle state determining unit compares the received signal with the predetermined conditions, thereby determining whether or not the detected vehicle state meets the conditions. When the detected vehicle state meets the conditions (YES), the control procedure advances to ST05.

ST05: The cleaning controller is turned on, and supply of electrical power is started.

ST06: The motor starts rotating. In other words, the operation of the cleaning switch allows ejection of the cleaning agent for cleaning the headlamp lens.

ST07: When the lens is cleaned, the cleaning switch is turned off, thereby completing the cleaning procedure. The cleaning switch may also be turned off for some other reason.

Figure 10:
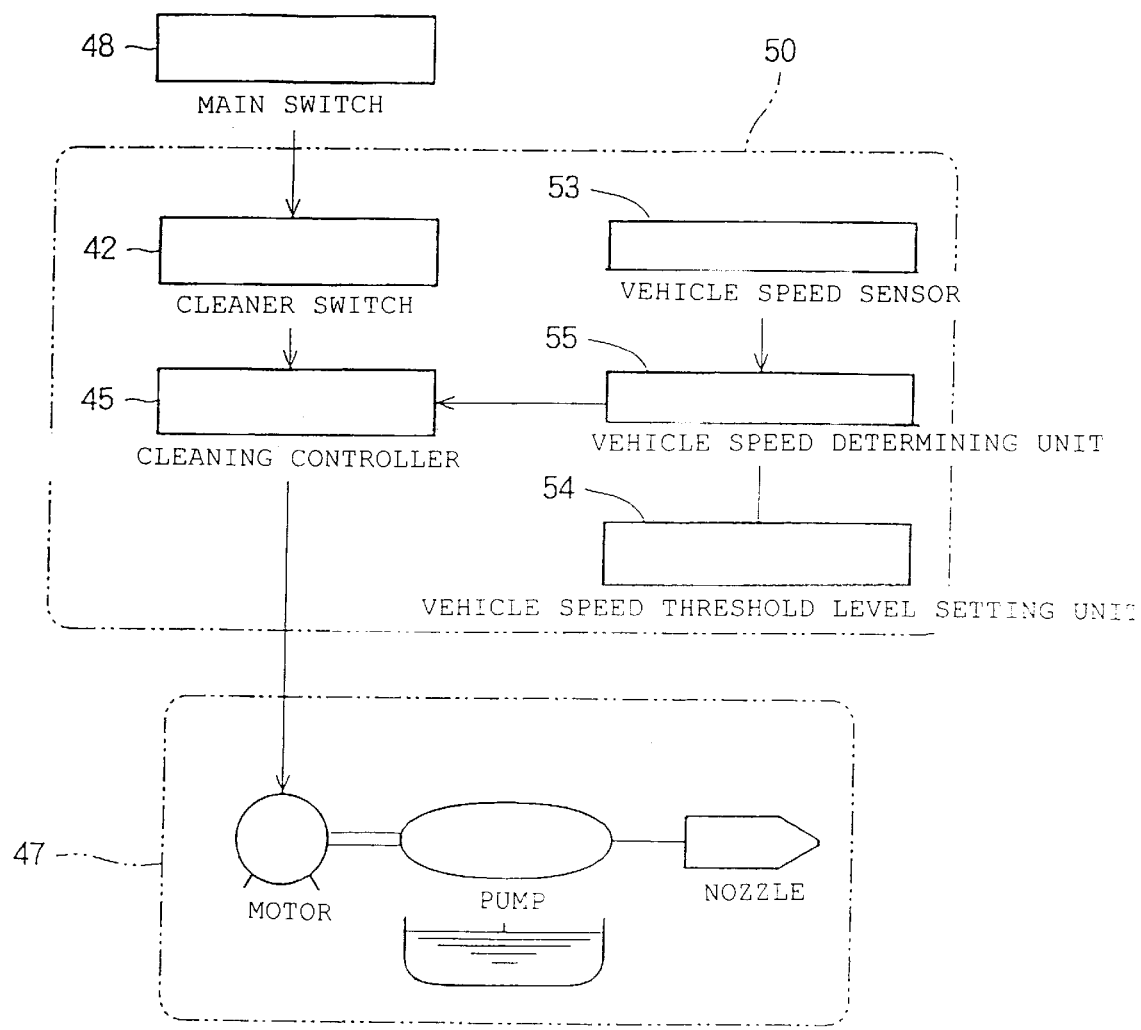
FIG. 10 is a block diagram of a second embodiment of a control unit for the headlamp cleaner.

FIG. 10 is a block diagram of a second embodiment of a control unit for the headlamp cleaner. Members that are identical to those in FIG. 8 are either assigned identical reference numerals or are not assigned any reference numeral. The control unit 50 includes: a cleaning switch 42; a vehicle speed sensor 53 for detecting a vehicle speed; a vehicle speed threshold level setting unit 54 for setting a vehicle speed at which the cleaning agent is adversely affected by wind caused by the running vehicle; a vehicle speed determining unit 55 functioning as a vehicle state determining unit and determining whether or not a signal indicative of a vehicle speed detected by the vehicle speed sensor is equal to, below or above the predetermined threshold level; and a cleaning controller 45 turning on or off the electrical power from the cleaning switch 42 in response to a signal from the vehicle speed determining unit 55.

Figure 11:
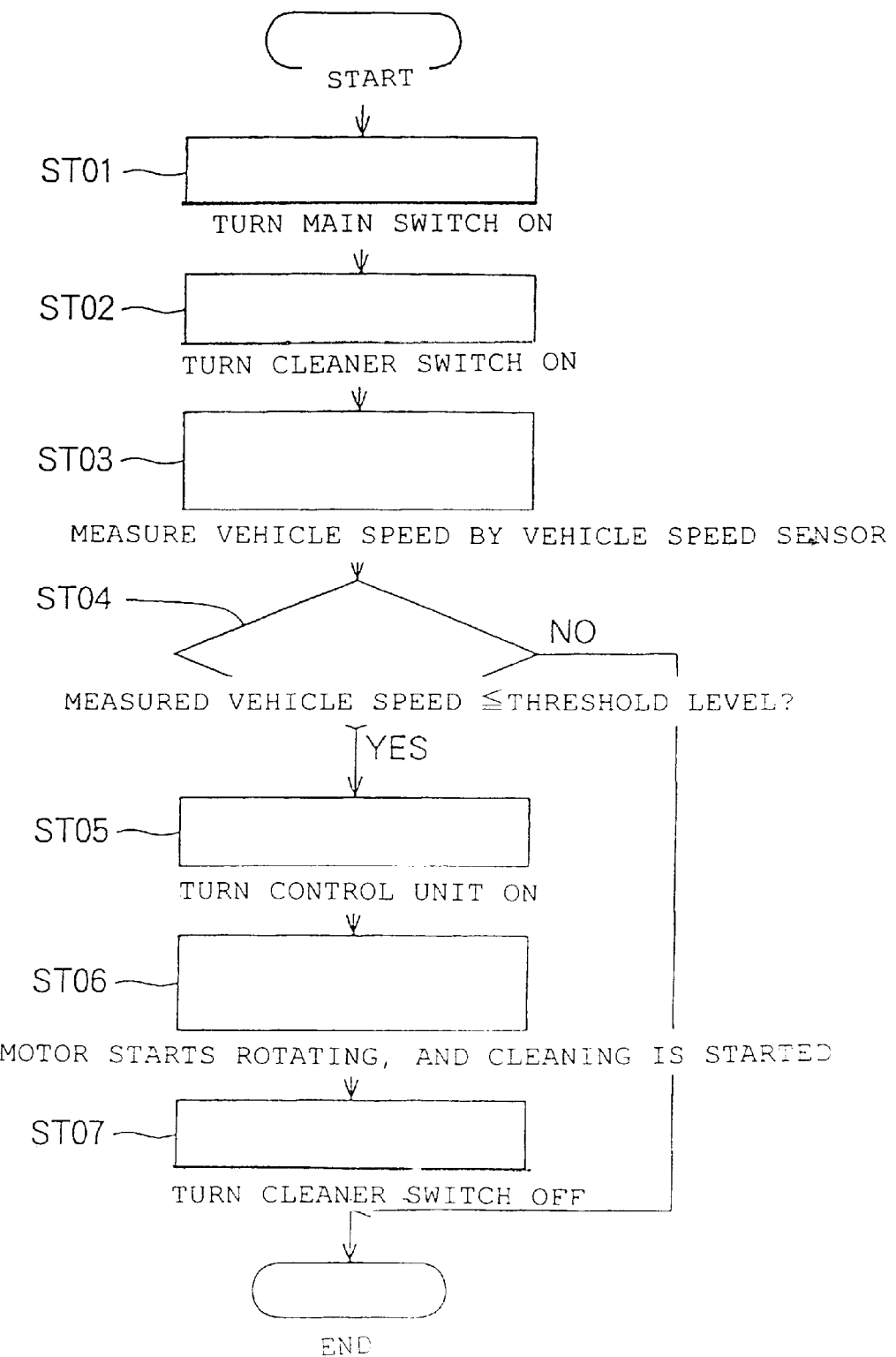
FIG. 11 is a flowchart illustrating an operation procedure of the control unit of FIG. 10.

FIG. 11 is a flowchart illustrating an operation procedure for the control unit 50 of FIG. 10. The operation includes the steps of:

ST01: The main switch is turned on using a key.

ST02: The cleaning switch is turned on.

ST03: The vehicle speed sensor measures a vehicle speed, and outputs a measured result to the vehicle speed determining unit.

ST04: The vehicle speed determining unit determines whether or not the detected vehicle speed is equal to or below the predetermined threshold level. If the detected vehicle speed is less than or equal to the threshold level YES), the control procedure advances to ST05.

ST05: The cleaning controller is turned on, and supply of electrical power is started.

ST06: The motor starts rotating.

ST07: The cleaning switch is turned off.

Figure 12:
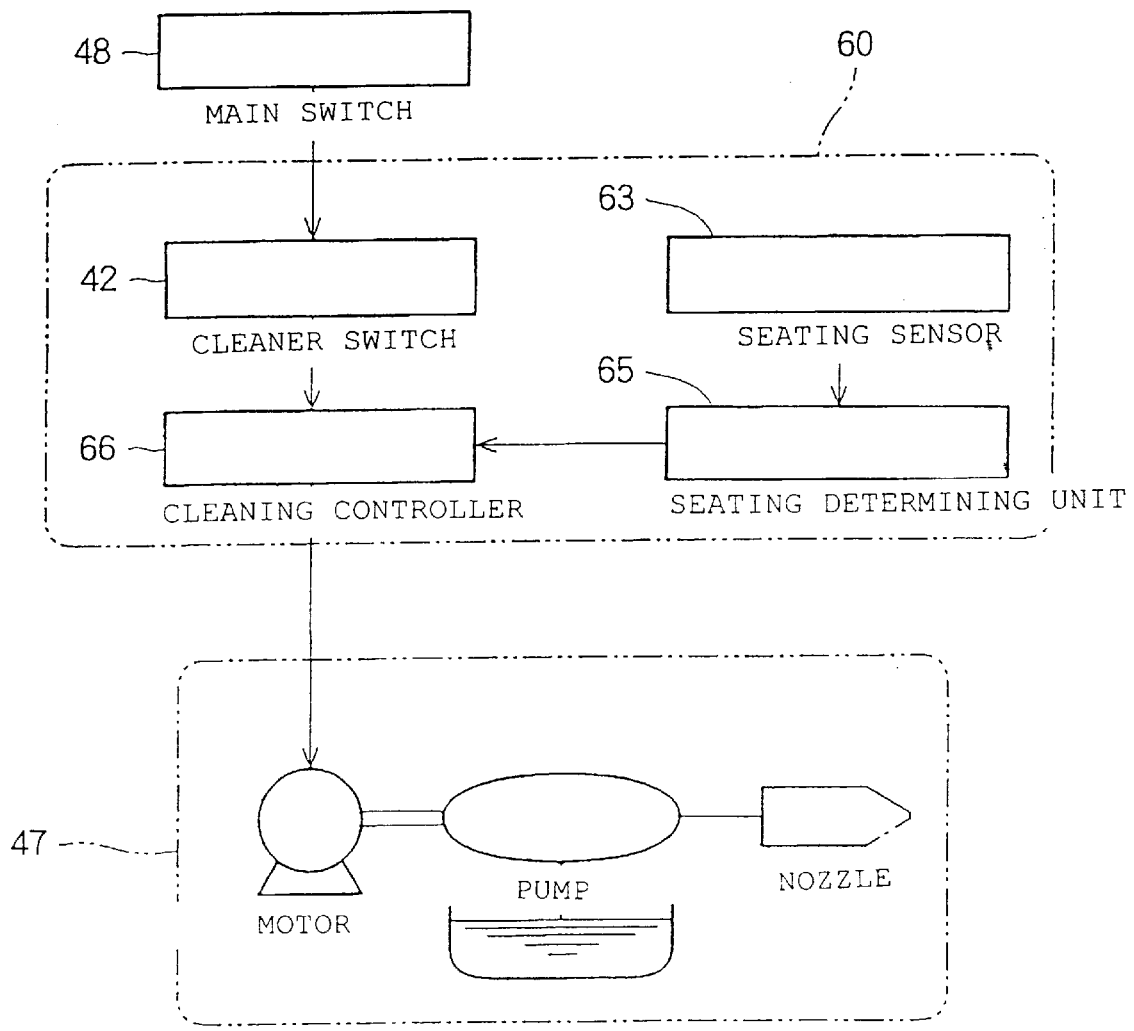
FIG. 12 is a block diagram of a third embodiment of a control unit for the headlamp cleaner.

FIG. 12 is a block diagram of a third embodiment of a control unit for the headlamp cleaner. Members that are identical to those in FIGS. 8 or 10 are either assigned identical reference numerals or are not assigned any reference numeral. The control unit 60 includes: a cleaning switch 42; a seating sensor 63; a seating determining unit 65, as a vehicle state determining unit, for detecting whether or not a rider is seated on the vehicle on the basis of a signal indicative of the detected result from the seating sensor 63; and a cleaning controller 65 turning on or off the supply of electrical power from the cleaning switch 42 in response to a signal from the seating determining unit 65. The seating sensor 63 may also function as the seating determining unit 65. Alternatively, the seating sensor 63 may be a limit switch, which directly provides the cleaning controller 66 with the signal indicative of the seating condition, without use of the seating determining unit 65.

Figure 13:
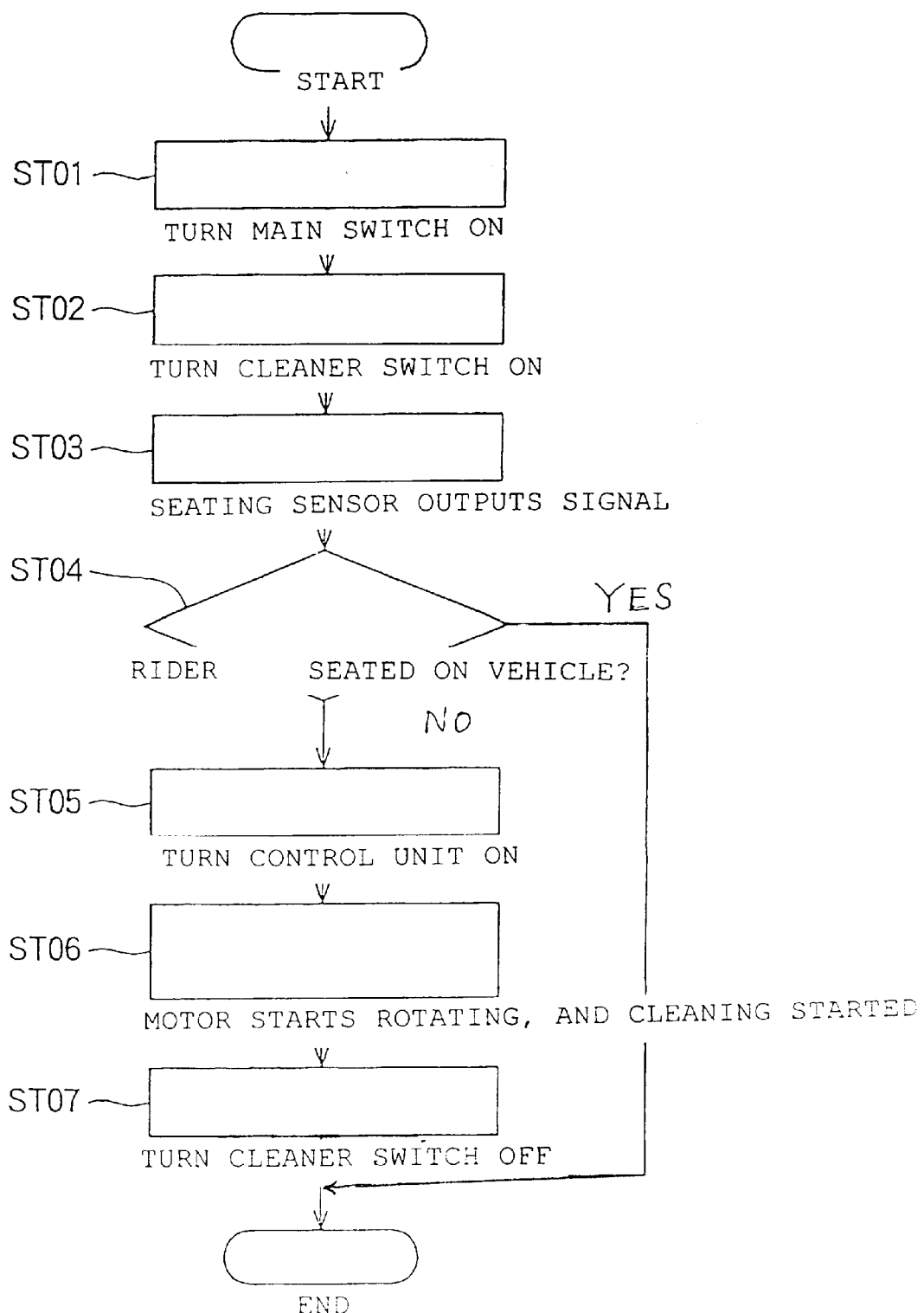
FIG. 13 is a flowchart illustrating an operation procedure for the control unit of FIG. 12.

FIG. 13 is a flowchart illustrating an operation procedure for the control unit 60 of FIG. 12. The operation includes the steps of:

ST01: The main switch is turned on.

ST02: The cleaning switch is turned on.

ST03: The seating sensor outputs a signal indicative of a detected result.

ST04: The seating determining unit determines whether or not the rider is seated on the vehicle, on the basis of the signal from the seating sensor. If the vehicle is not attended (NO), control procedure advances to ST05.

ST05: The cleaning controller is turned on, and supply of electrical power is started.

ST06: The motor starts rotating.

ST07: The cleaning switch is turned off.

Figure 14:
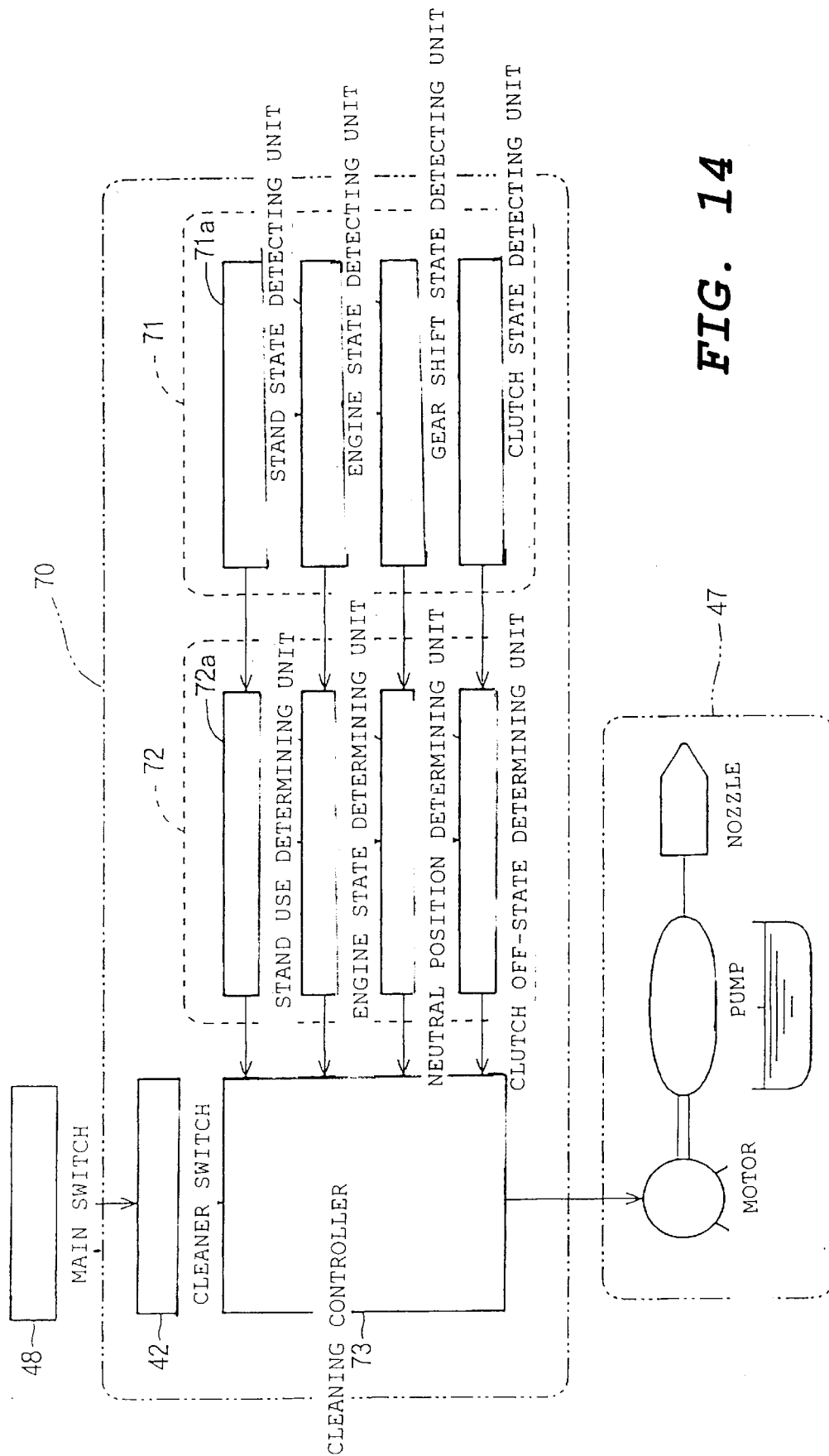
FIG. 14 is a block diagram of a fourth embodiment of a control unit for the headlamp cleaner.

FIG. 14 is a block diagram of a fourth embodiment of a control unit for the headlamp cleaner. Members that are identical to those in FIGS. 8, 10 or 12 are either assigned identical reference numerals or are not assigned any reference numeral. The control unit 70 includes: a cleaning switch 42; a vehicle state detecting unit 71; a vehicle state determining unit 72; and a cleaning controller 73. The vehicle state detecting unit 71 may be at least a stand state detecting unit 71a, an engine state detecting unit 71b, a gear shift state detecting unit 71c, or a clutch state detecting unit 71d.

The vehicle state determining unit 72 includes: a stand use determining unit 72a for determining whether or not the stand is being used on the basis of the signal from the stand state detecting unit 71a; an engine operation determining unit 72b for determining whether or not the engine is active, on the basis of a signal from the engine state detecting sensor 71b; a neutral position determining unit 72c for determining whether or not the gear shift is at the neutral position, on the basis of a signal from a gear shift state detecting unit 71c; and a clutch off state detecting unit 72d for determining whether or not the clutch remains inactive, on the basis of a signal from the clutch state detecting unit 71d.

The cleaning controller 73 allows cleaning of the headlamp lens in response to the following signals: a signal indicating that the stand is in use, from the stand use determining unit 72a; a signal indicating that the engine remains inactive, from the engine state determining unit 72b; a signal indicating that the gear shift is at the neutral position, from the neutral position determining unit 72c; and a signal indicating that the clutch remains inactive, from the clutch off state determining unit 72d. When a plurality of the detecting units 71a to 71d are provided, vehicle state determining units 72 will be used in accordance with the provided detecting units.

Figure 15:
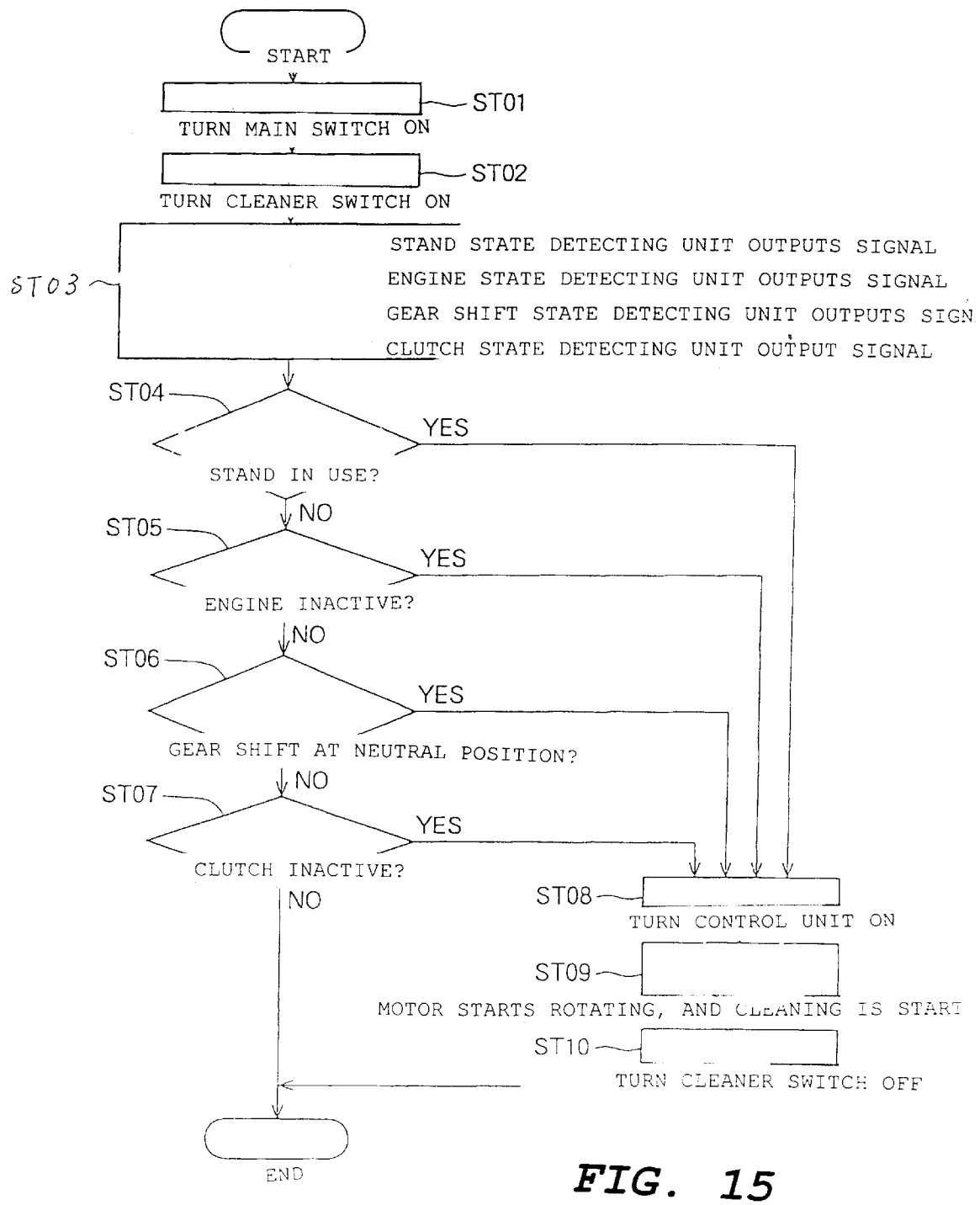
FIG. 15 is a flowchart illustrating an operation procedure for the control unit of FIG. 14.
Figure 16:
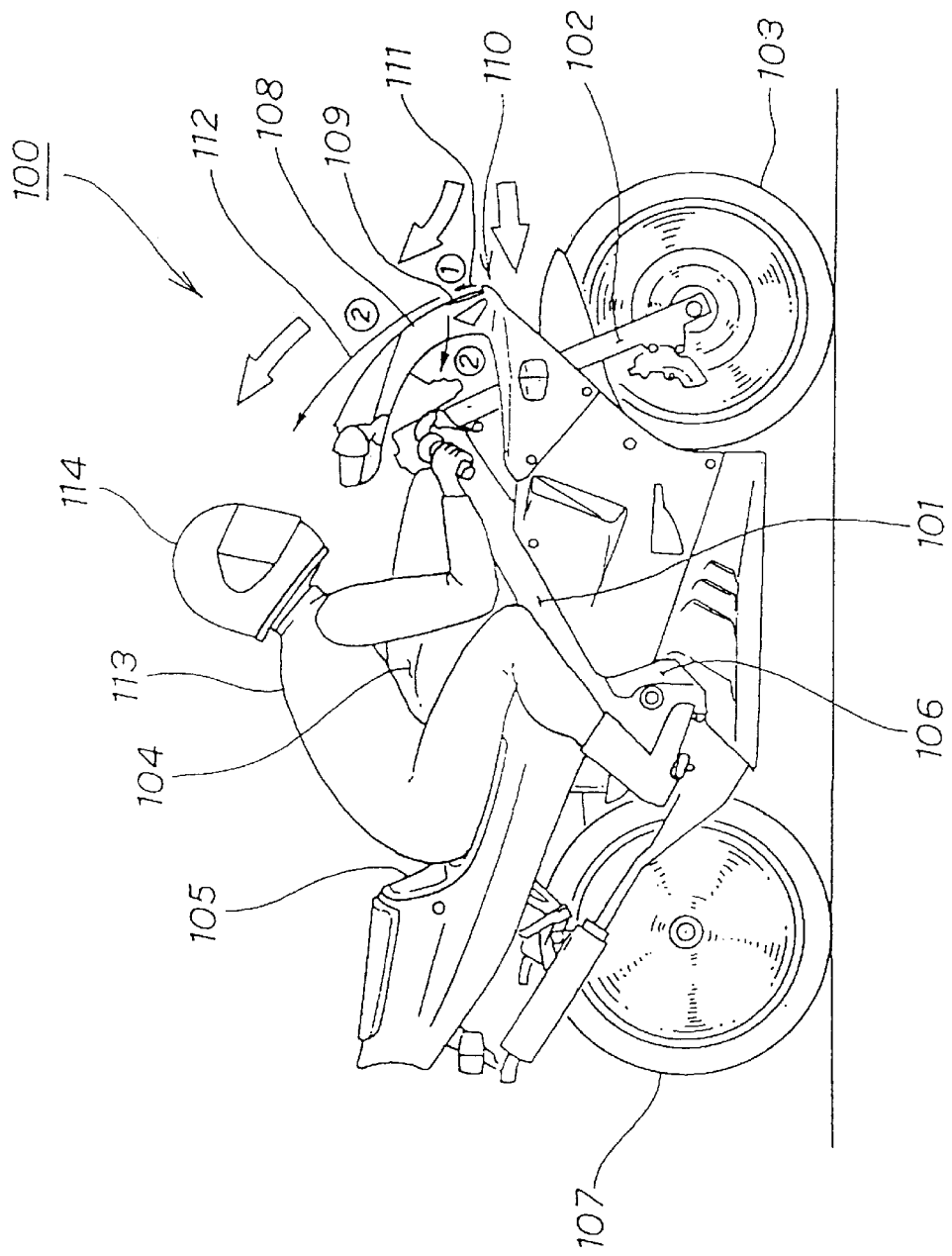
FIG. 16 is a side perspective view of a motorcycle having a headlamp cleaner in accordance with the background art.

FIG. 15 is a flowchart illustrating an operation procedure for the control unit 70 of FIG. 14. The operation procedure will first be described where there is only one vehicle state detecting unit provided. Later, the operation procedure will be described where there are a plurality of vehicle state detecting units provided.

When a single vehicle state detecting unit is provided, the operation includes the steps of:

ST01: The main switch is turned on.

ST02: The cleaning switch is turned on.

ST03: The stand state detecting unit outputs a signal indicative of a detected result.

ST04: The stand state determining unit determines whether or not the stand is in use, on the basis of the signal from the stand state detecting unit. If the stand is in use YES), control procedure advances to ST08.

ST08: The cleaning controller is turned on, and supply of electrical power is started.

ST09: The motor starts rotating.

ST10: The cleaning switch is turned off. The control procedure returns to step ST04.

ST04: If the stand is not in use (NO), the control procedure advances to END.

Alternatively, the control procedure is carried as follows on the basis of the engine state.

ST01: The main switch is turned on.

ST02: The cleaning switch is turned on.

ST03: The engine state detecting unit outputs a signal indicative of a detected result.

ST05: The engine state determining unit determines whether or not the engine remains inactive, on the basis of the signal from the engine state detecting unit. If the engine is inactive (YES), the control procedure advances to ST08.

ST08: The cleaning controller is turned on, and supply of electrical power is started.

ST09: The motor starts rotating.

ST10: The cleaning switch is turned off. Here, the control procedure returns to step ST05.

ST05: The control procedure advances to END if the engine is active (NO).

When two vehicle state detecting units are provided, e.g. on the basis of the engine state and the gear shift state, the operation includes the steps of:

ST01: The main switch is turned on.

ST02: The cleaning switch is turned on.

ST03: The engine state detecting unit outputs a signal indicative of a detected result.

ST03: The gear shift state determining unit outputs a signal indicative of a detected result.

ST05: The engine state determining unit determines whether or not the engine remains inactive, on the basis of the signal from the engine state detecting unit. If the engine is active (NO), the control procedure advances to ST06.

ST06: The neutral position determining unit determines whether or not the gear shift is at the neutral position, on the basis of the signal from the gear shift state detecting unit. The control procedure advances to step ST08 if the gear shift is at the neutral position (YES).

ST08: The cleaning controller is turned on, thereby starting supply of electrical power.

ST09: The motor starts rotating.

ST10: The cleaning switch is turned off.

When both the engine state detecting unit and the gear shift state detecting units are provided, the cleaning can be carried out with the engine kept in an idling state, which is effective in reducing a time period for making the vehicle ready for operation.

The operation procedure can also be executed as follows on the basis of the engine state and the clutch state:

ST01: The main switch is turned on.

ST02: The cleaning switch is turned on.

ST03: The engine state detecting unit outputs a signal indicative of a detected result.

ST03: The clutch state detecting unit outputs a signal indicative of a detected result.

ST05: The engine state determining unit determines whether or not the engine remains inactive, on the basis of the signal from the engine state detecting unit. If the engine is active (NO), the control procedure advances to ST07.

ST07: The clutch off-state determining unit determines whether or not the clutch remains inactive, on the basis of the signal from the clutch state detecting unit. The control procedure advances to ST08 if the clutch remains inactive (YES).

ST08: The cleaning controller is turned on, and supply of electrical power is started.

ST09: The motor starts rotating.

ST10: The cleaning switch is turned off.

When both the engine and clutch state detecting units are provided, the cleaning can be performed with the clutch kept inactive even during the operation of the engine, which is allows the headlamp lens to be cleaned without having to stop the engine.

In the configuration shown in FIG. 15, the plurality of detecting units may be replaced with the engine state detecting unit and the stand state detecting unit. When the stand is in use, the headlamp lens cleaning can be carried out while the engine is being warmed up. This is effective in reducing a time for making the vehicle ready for operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A headlamp cleaner for cleaning a lens of a headlamp at a front part of a vehicle, said cleaner comprising:

a frame;

a headlamp lens inside said frame wherein said frame includes upper, left and right portions extending forwardly away from an outer surface of said headlamp lens; and a cleaning nozzle attached to said upper portion of said frame, said nozzle having at least one hole substantially directed downwardly toward a ground surface beneath said vehicle for ejecting a cleaning agent across said lens.

2. The headlamp cleaner according to claim 1, further comprising:

a front cover for extending over a front part of the vehicle; and an opening provided within said front cover, peripheral edges of said opening forming said frame and surrounding said headlamp lens, and wherein at least a portion of said peripheral edges is folded rearwardly away from a front of the vehicle.

3. The headlamp cleaner according to claim 2, wherein said frame further includes a lower portion extending forwardly away from an outer surface of said headlamp lens.

4. The headlamp cleaner according to claim 2, wherein said front cover has guides for leading the cleaning agent from an area enclosed by said frame to a lower area outside said frame.

5. The headlamp cleaner according to claim 4, wherein said frame includes upper, left and right portions extending forwardly away from an outer surface of said headlamp lens.

6. The headlamp cleaner according to claim 5, wherein said frame further includes a lower portion extending forwardly away from an outer surface of said headlamp lens.

7. The headlamp cleaner according to claim 1, wherein said cleaning nozzle has a plurality of downwardly directed holes.

8. A headlamp cleaner for cleaning a lens of a headlamp at a front part of a vehicle, said cleaner comprising:

a headlamp lens;

a cleaning nozzle, said nozzle having at least one hole for ejecting a cleaning agent across said lens;

a first detector for detecting a vehicle state;

an evaluator for determining whether or not the detected vehicle state meets a predetermined condition; and a cleaning controller for controlling whether cleaning of said headlamp lens is allowed or prohibited, on the basis of whether the predetermined condition has been met.

9. The headlamp cleaner according to claim 8, wherein said first detector is a vehicle speed sensor, said evaluator determines whether or not a detected vehicle speed exceeds a predetermined threshold level, and said cleaning controller allows cleaning of said headlamp lens when the detected vehicle speed is equal to or below the predetermined threshold level and prohibits cleaning of said headlamp lens when the detected vehicle speed exceeds the predetermined threshold level.

10. The headlamp cleaner according to claim 8, wherein said first detector is a seating sensor, said evaluator determines whether or not a rider is seated, and said cleaning controller allows cleaning of said headlamp lens when the rider is not seated and prohibits cleaning of said headlamp lens when the rider is seated.

11. The headlamp cleaner according to claim 8, wherein said first detector is a stand state sensor, said evaluator determines whether or not a stand is in use, and said cleaning controller allows cleaning of said headlamp lens when the stand is in use and prohibits cleaning of said headlamp lens when the stand is retracted toward the vehicle.

12. The headlamp cleaner according to claim 8, wherein said first detector is an engine running sensor, said evaluator determines whether or not the engine is running, and said cleaning controller allows cleaning of said headlamp lens when the engine is not running and prohibits cleaning of said headlamp lens when the engine is running.

13. The headlamp cleaner according to claim 8, wherein said first detector is a clutch state sensor, said evaluator determines whether or not the clutch has disengaged an engine from a transmission, and said cleaning controller allows cleaning of said headlamp lens when the clutch is disengaging the engine from the transmission and prohibits cleaning of said headlamp lens when the clutch is engaging the engine with the transmission.

14. The headlamp cleaner according to claim 8, wherein said first detector is a transmission state sensor, said evaluator determines whether or not the transmission is in neutral or a gear, and said cleaning controller allows cleaning of said headlamp lens when the transmission is in neutral and prohibits cleaning of said headlamp lens when the transmission is in a gear.

15. The headlamp cleaner according to claim 8, further comprising:

a second detector, a third detector, and a fourth detector; wherein said first detector is a stand state sensor, said second detector is an engine running sensor, said third detector is a clutch state sensor, and fourth detector is a transmission state sensor; said evaluator determines whether or not a stand is in use, whether or not the engine is running, whether or not the clutch has disengaged the engine from a transmission, and whether or not the transmission is in neutral or a gear; and said cleaning controller allows cleaning of said headlamp lens when the stand is in use, the engine is not running, the clutch is disengaging the engine from the transmission, or the transmission is in neutral.

16. The headlamp cleaner according to claim 8, further comprising:

an electrical pump;

a hose connecting said pump to said nozzle; and an electrical switch for operation by the rider of the vehicle to signal when cleaning of said headlamp lens is desired.

17. A headlamp cleaner for cleaning a lens of a headlamp at a front part of a vehicle, said cleaner comprising:

a frame;

a headlamp lens inside said frame;

a cleaning nozzle attached to an upper half of said frame, said nozzle having at least one hole substantially directed downwardly toward a ground surface beneath said vehicle for ejecting a cleaning agent across said lens;

a first detector for detecting a vehicle state;

an evaluator for determining whether or not the detected vehicle state meets a predetermined condition; and a cleaning controller for controlling whether cleaning of said headlamp lens is allowed or prohibited, on the basis of whether the predetermined condition has been met.

18. The headlamp cleaner according to claim 17, further comprising:

a front cover for extending over a front part of the vehicle; and an opening provided within said front cover, peripheral edges of said opening forming said frame and surrounding said headlamp lens, and wherein at least a portion of said peripheral edges is folded rearwardly away from a front of the vehicle.

19. The headlamp cleaner according to claim 17, further comprising:

a second detector, a third detector, and a fourth detector; wherein said first detector is a stand state sensor, said second detector is an engine running sensor, said third detector is a clutch state sensor, and fourth detector is a transmission state sensor; said evaluator determines whether or not a stand is in use, whether or not the engine is running, whether or not the clutch has disengaged the engine from a transmission, and whether or not the transmission is in neutral or a gear; and said cleaning controller allows cleaning of said headlamp lens when the stand is in use, the engine is not running, the clutch is disengaging the engine from the transmission, or the transmission is in neutral.

* * * * *